(12) United States Patent
Schudt et al.

(10) Patent No.: US 8,973,611 B2
(45) Date of Patent: Mar. 10, 2015

(54) PRESSURE CONTROL VALVE HAVING AN AXIAL SUPPLY PORT

(75) Inventors: Klaus Schudt, Nordheim (DE); Kurt Gensheimer, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 13/212,732

(22) Filed: Aug. 18, 2011

(65) Prior Publication Data

US 2012/0048400 A1 Mar. 1, 2012

(30) Foreign Application Priority Data

Aug. 30, 2010 (DE) .......................... 10 2010 039 917

(51) Int. Cl.
| *F15B 13/044* | (2006.01) |
| *G05D 16/20* | (2006.01) |
| *F16K 11/07* | (2006.01) |
| *F16K 31/06* | (2006.01) |
| *F15B 13/04* | (2006.01) |
| *F15B 13/08* | (2006.01) |
| *F16H 61/02* | (2006.01) |

(52) U.S. Cl.
CPC ........ *G05D 16/2013* (2013.01); *F15B 13/0442* (2013.01); *F16K 11/0716* (2013.01); *F16K 31/0613* (2013.01); *F15B 13/0402* (2013.01); *F15B 13/0835* (2013.01); *F16H 61/0251* (2013.01)

USPC ............. 137/625.67; 137/625.27; 137/625.65

(58) Field of Classification Search
USPC .......................... 137/625.27, 625.65, 625.67
See application file for complete search history.

(56) References Cited

U.S. PATENT DOCUMENTS

| 4,403,765 | A | * | 9/1983 | Fisher ...................... 137/625.65 |
| 4,488,574 | A | * | 12/1984 | Bartholomaus .......... 137/625.65 |
| 4,538,645 | A | * | 9/1985 | Perach ..................... 137/625.65 |
| 4,579,145 | A | * | 4/1986 | Leiber et al. ............. 137/625.65 |
| 4,790,513 | A | * | 12/1988 | Davis et al. .............. 137/625.65 |
| 4,844,122 | A | * | 7/1989 | Ichihashi ................. 137/625.65 |
| 4,979,542 | A | * | 12/1990 | Mesenich ................ 137/625.65 |
| 5,246,033 | A | * | 9/1993 | Brehm et al. ............ 137/625.65 |
| 5,261,456 | A | * | 11/1993 | Patton et al. ............. 137/625.65 |
| 5,651,530 | A | * | 7/1997 | Krimmer et al. ......... 137/625.65 |
| 6,581,634 | B2 | * | 6/2003 | Najmolhoda et al. ... 137/625.65 |
| 6,701,959 | B1 | * | 3/2004 | Flynn et al. .............. 137/625.65 |
| 2001/0025662 | A1 | | 10/2001 | Kawamura et al. |
| 2012/0048398 | A1 | * | 3/2012 | Schudt et al. ................. 137/514 |

FOREIGN PATENT DOCUMENTS

| CN | 1318703 | 10/2001 |
| DE | 197 33 660 | 2/1999 |
| DE | 198 47 021 | 4/2000 |
| DE | 201 00 950 | 6/2002 |

* cited by examiner

*Primary Examiner* — John Rivell
(74) *Attorney, Agent, or Firm* — Kenyon & Kenyon LLP

(57) ABSTRACT

A pressure control valve designed as a slide valve and having an axially situated supply port.

13 Claims, 2 Drawing Sheets

PRESSURE CONTROL VALVE HAVING AN AXIAL SUPPLY PORT

FIELD OF THE INVENTION

The present invention relates to a pressure control valve, in particular for an automatic transmission in a motor vehicle.

BACKGROUND INFORMATION

Hydraulically operated clutches are used for shifting gears in modern automatic transmissions of automobiles. To enable these switching operations to take place smoothly and without being noticeable to the driver, it is necessary to set the hydraulic pressure at the clutches with maximum precision according to predefined pressure ramps. Electromagnetically operated pressure control valves are used for this purpose. These valves may be designed either as seat valves or slide valves. As a rule, both structural designs have three hydraulic ports for inflow, control pressure and return flow. In seat valves, the ports may usually be situated both axially and radially.

A seat valve of this type is described in German Patent Application No. DE 197 33 660. The exemplary embodiments illustrated therein have both radial and axial inflow ports.

To maintain the pressure control function of slide valves, it is necessary for either tank pressure or control pressure to be present at the end faces of the slide or control piston. Therefore, the corresponding ports are usually situated radially. A slide valve of this type is described in German Patent Application No. DE 201 00 950 U1, it being possible to connect the tank port axially in one exemplary embodiment. A slide valve having an axially situated working port, at which the desired control pressure is present, is described in German Patent Application No. DE 198 47 021 B4.

Modern transmission control systems have hydraulic lines of high complexity. Due to the limited installation space, it is often not possible to separate the supply lines in a way that enables these lines to be routed to the pressure control valves in any manner.

SUMMARY OF THE INVENTION

The present invention provides a pressure control valve of the slide design in which the supply port is easily and economically mounted on the end face of the hydraulic part of the valve. Degrees of freedom in integrating the hydraulic system and in situating and mounting the pressure control valve are obtained thereby.

One advantageous embodiment of the present invention provides that a slide sleeve having a valve connecting element forms an annular inflow channel on the end face. This ensures that the inflow pressure is guided radially from the end face of the valve to the control piston.

In addition, it is provided that the slide sleeve has at least one radially situated opening. One of the radial openings is hydraulically connected to the annular inflow channel. Due to the radial openings, the various valve ports are hydraulically connected to the corresponding sections of the control piston, and the pressure control function of the control piston is implemented through simple means.

To ensure that the inflow pressure does not act upon the end face of the control piston and negatively influence the pressure control function thereof, the end face of the slide sleeve is sealed in a pressure-tight manner. An easy-to-manufacture approach is to press a sealing plug onto the end face of the slide sleeve. The sealing plug may be implemented from plastic or as a punched and bent part made of sheet metal. Both variants may be non-detachably and tightly mounted on the slide sleeve with the aid of a simple press connection.

The pressure control function is implemented by the fact that the valve has a control piston which hydraulically connects a working port to the supply port in an open end position and hydraulically separates the working port from a return port. In the non-activated state, this means that when the coil of an electromagnetic actuating device is not energized, its armature moves in the direction of opening with the aid of the helical spring mounted on the magnet and moves the control piston in the direction of an opened end position of the pressure control valve via a push rod. The first section of the control piston thus releases the inflow pressure opening, and the pressure medium flows into an annular chamber which is delimited by the slide sleeve and the control piston. Since the third section of the control piston simultaneously separates the return opening from the annular chamber, the pressure prevailing at the supply port is also present at the working port.

When the coil is energized, the electromagnetic force acts against the restoring force of the spiral spring on the magnet side, which has deflected the control piston in the direction of the end face. The control piston is moved back into the closed end position by the restoring spring mounted on the piston side. In the closed end position, the control piston seals the inflow pressure opening and simultaneously releases the return opening. Because tank pressure is present in the return opening and this tank pressure is lower than the working pressure prevailing in the annular chamber, the pressure medium flows to the return port via the return opening.

The same applies to an electromagnetic actuating device, which is not described in further detail herein and which operates without a spiral spring on the magnet side and whose electromagnet acts in the opposite direction. Through these means, the supply port is closed in the de-energized state and the return opening is closed in the energized state.

In the pressure control valve according to the present invention, the force which acts upon the control piston against the direction of opening depends on the pressure instantaneously prevailing at the control pressure opening. If the pressure drops at the control pressure opening, the force acting upon the control piston against the direction of opening is also reduced, and the control piston is moved in the direction of opening. However, if the pressure prevailing at the control pressure opening increases, the force acting upon the control piston against the direction of opening also increases, whereby it moves against the direction of opening. This self-control function of the control piston is achieved by the fact that the hydraulic surface acting in the direction of opening differs from the hydraulic surface acting against the direction of opening.

This difference between the hydraulic surfaces acting against and in the direction of opening is achieved by the stepped guide bore in the slide sleeve, which has a smaller diameter in the first section of the control piston than it does in the third section of the control piston.

All in all, a pressure control valve is obtained via the present invention, which provides a precise self-control function and simultaneously ensures a simple structural design and correspondingly low manufacturing costs.

It is also beneficial that the control piston has a first control edge which throttles the pressure medium flow which flows from the supply port to the working port when the control piston is in an intermediate position. The control piston also has a second control edge which throttles the pressure medium flow which flows from the working port to the return port when the control piston is in an intermediate position between the open and closed end positions. This makes it possible to implement a continuous pressure control characteristic of the valve.

It is particularly helpful if the present invention includes a control piston which has at least one channel which connects a first compensating volume, which is delimited by an end face of the control piston, in the area of the supply port to a second compensating volume at the opposite end of the control piston. As a result, the same hydraulic pressure, i.e., the tank pressure, is present at the end faces of the control piston. The movements of the control piston cause the hydraulic oil to move back and forth without pressure between the compensating volumes.

In addition, it is provided that the channel be designed as a combination of a longitudinal bore and a transverse bore. This makes the control piston for the pressure control valve according to the present invention easy and economical to manufacture.

An easy-to-manufacture approach provides that the valve connecting element is designed as an injection-molded plastic part. The control sleeve may thus be easily fixed within the valve housing.

DETAILED DESCRIPTION

Figure 1:
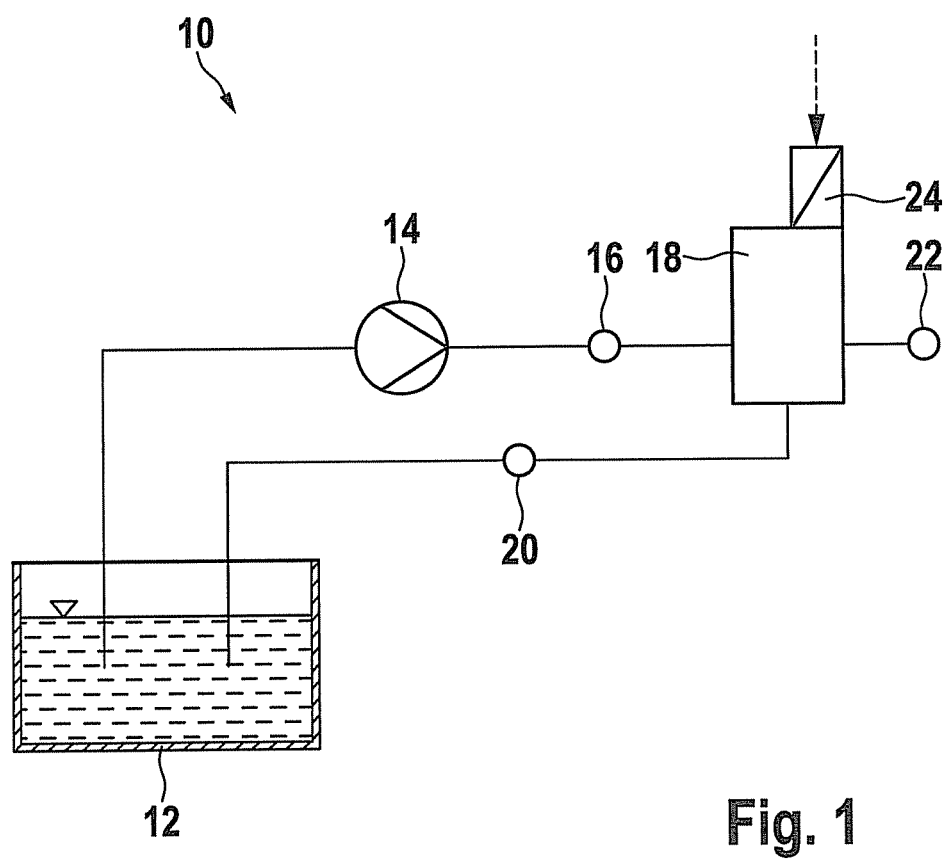
FIG. 1 shows a schematic representation of a hydraulic circuit in which a pressure control valve according to the present invention is used.

Among other things, a hydraulic circuit 10, to which an unpressurized hydraulic reservoir 12 and a hydraulic pump 14 belong, is used to control automatic transmissions as they are used in automobiles, for example. An outlet of hydraulic pump 14 forms a supply port 16, to which a pressure control valve 18 is connected.

A return flow to a return port 20, which leads back to a hydraulic oil reservoir 12, leads from pressure control valve 18. Furthermore, pressure control valve 18 is connected to a working port 22 at which the pressure to be controlled by pressure control valve 18 is present. In addition, pressure control valve 18 has an electromagnetic actuating device 24.

Figure 2:
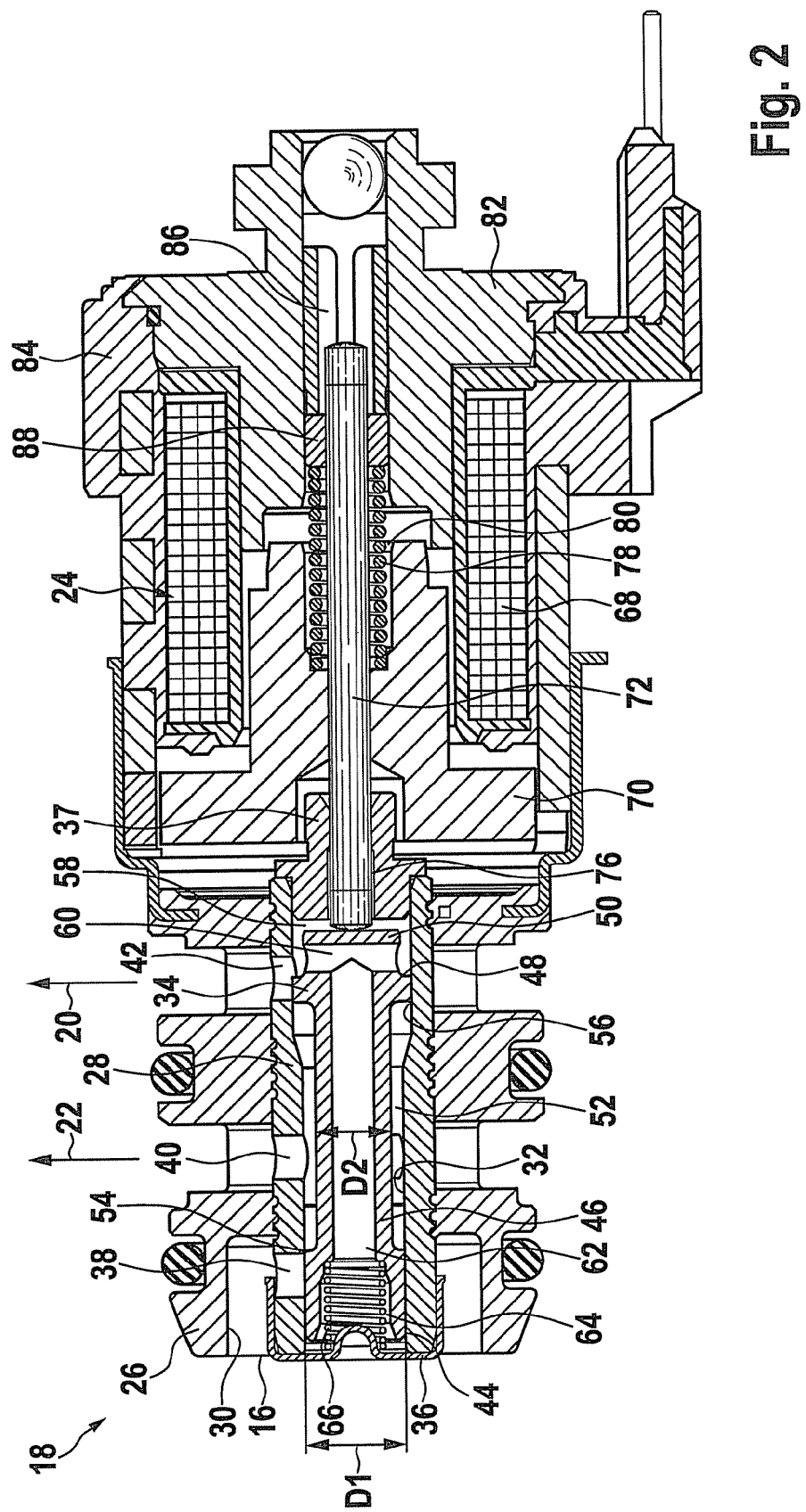
FIG. 2 shows a partial section of a pressure control valve according to the present invention.

FIG. 2 shows the structure of a pressure control valve 18 according to the present invention. Pressure control valve 18 includes a valve connecting element 26, which is preferably manufactured from plastic. Valve connecting element 26 has a concentric recess (without a reference numeral), into which a slide sleeve 28 is inserted in such a way that it forms an annular inflow channel 30 together with valve connecting element 26. Slide sleeve 28 has a continuous and stepped guide bore 32, which is used to accommodate a control piston 34. On the left side in FIG. 2, the end face of slide sleeve 28 is sealed pressure-tight by a sealing cap 36, which may be pressed on or shrunk-fitted, for example.

The opposite side (on the right in FIG. 2) of slide sleeve 28 is sealed by a bearing bush 37. Three openings 38, 40 and 42 are situated side by side in the axial direction on the circumference of slide sleeve 28. The first opening, hereinafter referred to as inflow pressure opening 38, in slide sleeve 28 opens guide bore 32 in the direction of inflow channel 30 and thus in the direction of supply port 16 when control piston 34 is correspondingly activated.

FIG. 2 shows pressure control valve 18 in the equilibrium position, so that no hydraulic connection exists between inflow channel 30 and guide bore 32. This equilibrium position is an intermediate position between the open and closed end positions.

The second transverse bore in slide sleeve 28, which is identified below as control pressure opening 40, connects guide bore 32 to working port 22. The third transverse bore, hereinafter referred to as return opening 42, establishes a hydraulic connection between guide bore 32 and return port 20.

Control piston 34 is divided into four adjacent sections 44, 46, 48 and 50 in the axial direction. Outermost left and first section 44 in FIG. 2 has a first diameter D1. Control piston 34 is guided within guide bore 32 with the aid of this first diameter D1.

The approximately centered second section 46, which adjoins first section 44, has a second diameter D2 which is smaller than first diameter D1 and which is smaller than the diameter of guide bore 32 in this area. This results in an annular chamber 52.

Third section 48, which adjoins second section 46, has a larger diameter than first section 44 and is guided sealingly but axially slidable in guide bore 32 of slide sleeve 28. This delimits annular chamber 52 in the axial direction.

In fourth and final section 50, the diameter of control piston 34 is smaller than that of guide bore 32. This results in a second compensating volume 58, which is delimited in the axial direction by bearing bush 37 and push rod 72.

Due to this particular form of control piston 34, second section 46 of control piston 34 and slide sleeve 28 form an annular chamber 52 which communicates with working port 22 via control pressure opening 40. The edge of first section 44 which faces second section 46 forms a first control edge 54 whose function is discussed in greater detail below.

The edge of third section 48 which faces second section 46 forms a second control edge 56. Control piston 34 has a transverse bore 60 in the fourth section. A longitudinal bore 62, which penetrates control piston 34 along its entire length, adjoins transverse bore 60. As a result, the same pressure prevails in first compensating volume 64 and in second compensating volume 58.

A first spiral spring 66, which is supported against control piston 34, on the one hand, and against sealing cap 36, on the other hand, is located in first compensating volume 64, the sealing cap sealing the end face of slide sleeve 28.

In FIG. 2, electromagnetic actuating device 24 is situated on the right side of pressure control valve 18. It includes, among other things, an annular coil 68 and a centrally situated armature 70. A push rod 72, which is situated coaxially to armature 70, transmits the adjusting movement of armature 70 to control piston 34.

First spiral spring 66 holds control piston 34 in contact with push rod 72. Push rod 72 is guided sealingly but axially slidable in a through-opening 76 in bearing bush 37, which seals slide sleeve 28.

A second spiral spring 78 is pushed onto piston rod 72 in a concentric recess 80 of armature 70. Spiral spring 78 is supported on armature 70, on the one hand, and on a coil core 82, on the other hand. Coil core 82 simultaneously forms a cover for a housing 84 in which electromagnetic actuating device 24 is situated. A slide bearing 88, which accommodates the end of piston rod 72 facing away from armature 70, is introduced into a coaxial bore 86 in coil core 82.

Pressure control valve 18 operates as follows: When electromagnetic actuating device 24 pushes control piston 34 into the open position due to spiral spring 78 in the de-energized state of coil 68 (to the left in FIG. 2; not illustrated), hydraulic oil flows under high pressure from supply port 16 to annular chamber 52 via inflow pressure opening 38 and from the annular chamber to working port 22 via control pressure opening 40. Return opening 42 in this case is largely covered by second control edge 56. Return port 20 is thus largely separated from annular chamber 52. As a result, the same pressure thus prevails at both working port 22 and supply port 16.

However, if control piston 34 is in a rather right-hand position, for example when the coil is energized, inflow pressure opening 38 is covered by first control edge 54, and annular chamber 52 is thus largely separated from supply port 16. Instead, second control edge 56 now releases return opening 42 so that working port 22 communicates with return port 20 via control pressure opening 40, annular chamber 52 and return opening 42. In this way, the pressure prevailing at working port 22 is reduced via return port 20 because, in a first approximation, ambient pressure prevails there.

The different intermediate positions of control piston 34 make it possible to set any pressure in working port 22; the pressure cannot be higher than in supply port 16 and not lower than in return port 20.

The position of control piston 34 results from the equilibrium of forces between the hydraulic forces acting upon control piston 34 and push rod 72 and the restoring force of first spiral spring 66, on the one hand, and between the force applied to control piston 34 by electromagnetic actuating device 24 via push rod 72 and the force present at armature 70, due to second spiral spring 78, on the other hand.

To maintain the pressure control function, it is important that the sum of the hydraulic forces applied to the end faces of control piston 34 is more or less zero in a state of equilibrium, as shown in FIG. 2. This is ensured by the fact that first compensating volume 64, which is provided to the left of control piston 34 in FIG. 2 and in which first spiral spring 66 is situated, communicates with return opening 42 via longitudinal bore 62 and transverse bore 60 as well as with second compensating volume 58, which is provided to the right of control piston 34 in FIG. 2. Thus, the tank pressure present at return port 20 or in return opening 42 prevails in both compensating volumes 58 and 64.

Sealing cap 36 of slide sleeve 28 ensures that the inflow pressure does not act upon an end face of control piston 34.

What is claimed is:

1. A pressure control valve comprising:
   a control piston;
   a slide sleeve;
   a supply port;
   a working port; and
   a return port, wherein the supply port is situated parallel to a longitudinal axis of the slide sleeve,
   wherein the control piston has at least one section forming an annular chamber with the slide sleeve when the control piston is inserted in the slide sleeve,
   wherein a first edge of the section of the control piston forming the annular chamber throttles a pressure medium flowing from the supply port to the working port when the control piston is in an intermediate position in the slide sleeve,
   wherein a second edge of the section of the control piston forming the annular chamber and opposite to the first edge throttles a pressure medium flowing from the working port to the return port when the control piston is in an intermediate position in the slide sleeve, and
   wherein the slide sleeve is tightly sealed by a sealing cap on an end face in an area of the supply port, wherein the sealing cap surrounds the slide sleeve at the end face.

2. The pressure control valve according to claim 1, wherein the slide sleeve forms an annular inflow channel together with a valve connecting element.

3. The pressure control valve according to claim 1, wherein the slide sleeve has at least one radially situated opening.

4. The pressure control valve according to claim 2, wherein the annular inflow channel is hydraulically connected to a radially situated opening in the slide sleeve.

5. The pressure control valve according to claim 1, wherein the sealing cap is pressed onto the end face.

6. The pressure control valve according to claim 1, wherein the control piston hydraulically connects the working port to the supply port in an open end position and hydraulically separates the working port from the return port.

7. The pressure control valve according to claim 1, wherein the control piston hydraulically connects the working port to the return port in a closed end position and hydraulically separates the working port from the supply port.

8. The pressure control valve according to claim 1, wherein the control piston has a first control edge, and the first control edge throttles a pressure medium flowing from the supply port to the working port when the control piston is in an intermediate position.

9. The pressure control valve according to claim 1, wherein the control piston has a second control edge, and the second control edge throttles a pressure medium flowing from the working port to the return port when the control piston is in an intermediate position.

10. The pressure control valve according to claim 1, wherein the control piston has at least one channel which connects a first compensating volume situated on an end face of the control piston to a second compensating volume situated at an opposite end of the control piston.

11. The pressure control valve according to claim 10, wherein the channel includes a longitudinal bore and a transverse bore.

12. The pressure control valve according to claim 2, wherein the valve connecting element is designed as an injection-molded plastic part.

13. The pressure control valve according to claim 1, wherein the pressure control valve is connected to a clutch of an automatic transmission in a motor vehicle.

* * * * *